US011621745B2

(12) United States Patent
Frenger et al.

(10) Patent No.: US 11,621,745 B2
(45) Date of Patent: Apr. 4, 2023

(54) MULTIPLE-INPUT MULTIPLE-OUTPUT COMMUNICATION SYSTEM WITH SCALABLE POWER SUPPLY

(71) Applicant: Telefonaktiebolaget LM Ericsson (publ), Stockholm (SE)

(72) Inventors: Pål Frenger, Linköping (SE); Jan Hederen, Linghem (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/422,368

(22) PCT Filed: Jan. 16, 2020

(86) PCT No.: PCT/SE2020/050040
§ 371 (c)(1),
(2) Date: Jul. 12, 2021

(87) PCT Pub. No.: WO2020/162808
PCT Pub. Date: Aug. 13, 2020

(65) Prior Publication Data
US 2022/0123790 A1  Apr. 21, 2022

Related U.S. Application Data

(60) Provisional application No. 62/802,253, filed on Feb. 7, 2019.

(51) Int. Cl.
*H04B 7/0413* (2017.01)
*H01Q 3/26* (2006.01)
(52) U.S. Cl.
CPC .............. *H04B 7/0413* (2013.01); *H01Q 3/26* (2013.01)

(58) Field of Classification Search
CPC .............................. H04B 7/0413; H01Q 3/26
See application file for complete search history.

(56) References Cited

U.S. PATENT DOCUMENTS 9,166,690 B2 * 10/2015 Brower .............. H04B 10/2575
2018/0331546 A1 * 11/2018 Kutkut .................. H02J 7/0022

FOREIGN PATENT DOCUMENTS

EP           2375499 A1    10/2011
WO       2012064333 A1     5/2012
(Continued)

OTHER PUBLICATIONS

International Search Report and the Written Opinion of the International Searching Authority, issued in corresponding International Application No. PCT/SE2020/050040, dated Apr. 28, 2020, 14 pages.

(Continued)

*Primary Examiner* — David B Lugo
(74) *Attorney, Agent, or Firm* — Christopher & Weisberg, P.A.

(57) ABSTRACT

An antenna system (150) with distributed power supply is disclosed. The antenna system (150) comprises a CPU (151) comprising a central power supply (152), multiple antenna units (161, 162, ... 171, 172 ...) connected to the CPU by cables and at least one distributed power supply unit (180) located at someplace along a chain of antenna units. At least one antenna unit (161) receives power from the central power supply (152). In the antenna system (150), at least one antenna unit (171) receives power from another antenna unit (172), at least one antenna unit (173) receives power from the at least one distributed power supply unit (180) such that at least two power supply domains (191, 192) are set up. In each power supply domain, a number of antenna units are connected to the same power supply.

9 Claims, 15 Drawing Sheets

(56) References Cited

FOREIGN PATENT DOCUMENTS

| WO | 2018103897 A1 | 6/2018 |
|----|---------------|--------|
| WO | 2018169357 A1 | 9/2018 |

OTHER PUBLICATIONS

Artemis Networks LLC "Artemis pCell Products", 2019, 8 pages.

* cited by examiner

MULTIPLE-INPUT MULTIPLE-OUTPUT COMMUNICATION SYSTEM WITH SCALABLE POWER SUPPLY

CROSS REFERENCE TO RELATED APPLICATION(S)

This application is a 35 U.S.C. § 371 National Phase of PCT/SE2020/050040, filed Jan. 16, 2020, designating the United States, which claims the benefit of U.S. Provisional Application No. 62/802,253, filed Feb. 7, 2019, the disclosures of which are incorporated herein in their entirety by this reference.

TECHNICAL FIELD

Embodiments herein relate to Multiple-Input Multiple-Output (MIMO) communication system. In particular, they relate to an antenna system with multiple antenna units and distributed power supply and base stations comprising the antenna system.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as New generation (NG) and 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Massive MIMO is also known as large-scale antenna systems and very large MIMO. Massive MIMO is a multi-user MIMO technology where each base station (BS) is equipped with a large number of antenna elements, typically more than 50, which are being used to serve many terminals that share the same time and frequency band and are separated in the spatial domain. A key assumption is that there are many more BS antennas than terminals; at least twice as many, but ideally as many as possible. Massive MIMO offers many benefits over conventional multi-user MIMO. First, conventional multi-user MIMO is not a scalable technology, since it has been designed to support systems with roughly equal numbers of service antennas and terminals, and practical implementations typically relies on frequency-division duplex (FDD) operation. By contrast, in massive MIMO, the large excess of service antennas over active terminals Time-Division Duplexing (TDD) operation brings large improvements in throughput and radiated energy efficiency. These benefits result from the strong spatial multiplexing achieved by appropriately shaping the signals sent out and received by the base station antennas. By applying precoding to all antennas, the base station can ensure constructive interference among signals at the locations of the intended terminals, and destructive almost everywhere else. Furthermore, as the number of antennas increases, the energy can be focused with extreme precision into small regions in space. Other benefits of massive MIMO include use of simple low-power components since it relies on simple signal processing techniques, reduced latency, and robustness against intentional jamming.

When operating in TDD mode, massive MIMO may exploit the channel reciprocity property, according to which the channel responses are the same in both uplink (UL) and downlink (DL). Channel reciprocity allows the BSs to acquire channel state information (CSI) from pilot sequences transmitted by the terminals in the uplink, and this CSI is then useful for both the uplink and the downlink. By the law of large numbers, the effective scalar channel gain seen by each terminal is close to a deterministic constant. This is called channel hardening. Thanks to the channel hardening, the user devices, such as terminals, can reliably decode the downlink data using only long-term statistical CSI, making most of the physical layer control signaling redundant, i.e. low-cost CSI acquisition. This renders conventional resource allocation concepts unnecessary, and results in a simplification of the Media Access Control (MAC) layer. These benefits explain why massive MIMO has a central position in preliminary 5G discussions.

However, massive MIMO system performances are affected by some limiting factors: Channel reciprocity requires hardware calibration. In addition, the so-called pilot contamination effect is a basic phenomenon which profoundly limits the performance of massive MIMO systems. Theoretically, every terminal in a massive MIMO system could be assigned an orthogonal uplink pilot sequence. However, the maximum number of orthogonal pilot sequences that can exist is upper-bounded by the size of the coherence interval, which is the product of the coherence time and coherence bandwidth. Hence, adopting orthogonal pilots leads to inefficient resource allocation as the number of the user devices increases or it is not physically possible to perform when the coherence interval is too short. As a consequence, pilots must be reused across cells, or even within the home cell for higher cell density. This inevitably causes interference among user devices which share the same pilot. Pilot contamination does not vanish as the number of BS antennas grows large, and so it is the one impairment that remains asymptotically.

To implement massive MIMO in wireless communications networks, two different architectures may be adopted:

Centralized massive MIMO (C-maMIMO), where all the antennas are co-located in a compact area at both the BS and user device sides, as shown in FIG. 1. It represents the conventional massive MIMO system. FIG. 1 depicts a Centralized massive MIMO architecture.

Distributed massive MIMO (D-maMIMO), where BS antennas, herein named as Access Points (APs), are geographically spread out over a large area, in a well-planned or random fashion, as shown in FIG. 2. Antennas are connected together and to a Central Processing Unit (CPU) through high-capacity backhaul links, such as e.g. fiber-optic cables. It is also known as cell-free massive MIMO system. FIG. 2 depicts a Distributed massive MIMO architecture.

D-maMIMO architecture is an important enabler of network MIMO in future standards. Network MIMO is a terminology that is used for a cell-free wireless network, where all the BSs that are deployed over the coverage area act as a single BS with distributed antennas. This may be considered the ideal network infrastructure from a performance perspective, since the network has great abilities to spatially multiplex users and exactly control the interference that is caused to everyone.

The distinction between D-maMIMO and conventional distributed MIMO is the number of antennas involved in coherently serving a given user device. In D-maMIMO, every antenna serves every user device. Compared to C-maMIMO, D-maMIMO has the potential to improve both the network coverage and the energy efficiency, due to increased macro-diversity gain. This comes at the price of higher front haul requirements and the need for distributed signal processing. In D-maMIMO, the information regarding payload data, and power control coefficients, is exchanged via the backhaul network between the APs and the CPU. There is no exchange of instantaneous CSI among the APs or the central unit, that is CSI acquisition can be performed locally at each AP.

Due to network topology, D-maMIMO suffers from different degrees of path losses caused by different access distances to different distributed antennas, and very different shadowing phenomena that are not necessarily better. E.g. antennas deployed at the street level are more easily blocked by buildings than antennas deployed at elevated locations. Moreover, since the location of antennas in D-maMIMO has a significant effect on the system performance, optimization of the antenna locations is crucial. In addition, D-maMIMO potentially system suffers a low degree of channel hardening. As mentioned earlier, the channel hardening property is key in massive MIMO to suppress small-scale fading and derives from the large number of antennas involved in a coherent transmission. In D-maMIMO, APs are distributed over a wide area, and many APs are very far from a given user device. Therefore, each user device is effectively served by a smaller number of APs. As a result, channel hardening may be less pronounced. This would considerably affect the system performance.

The performance of any wireless communications network is clearly the availability of good enough CSI to facilitate phase-coherent processing at multiple antennas. Intuitively, acquiring high quality CSI should be easier with a C-maMIMO than in a D-maMIMO where the antennas are distributed over a large geographical area. Nevertheless, the macro-diversity gain has a dominant importance and leads to improved coverage and energy efficiency.

A problem with a massive MIMO deployment is that a large number of antennas generate a large amount of data. This implies that with traditional radio to antenna interfaces very large capacity fiber network are needed to shuffle this data around. Fiber is both expensive and needs skilled personal for installation. Both of which limit the deployment scenarios for massive MIMO. There is also a scalability issue as different size base-band units are needed to handle different array sizes, e.g. one to handle 32 antennas one other for 128 antennas etc.

From a practical point of view, the C-maMIMO solution where all antenna elements, e.g., APs, are placed close together has a number of drawbacks compared to D-maMIMO solution where the antenna elements are distributed over a larger area. These are e.g.:

Very large service variations: UEs that happen to be located close to the central massive MIMO node will experience very good service quality while for UEs further away the service quality will degrade rapidly.

Sensitive to blocking: On high frequency bands in particular, the signal is easily blocked by obstacles that obscures the line-of-sight between the UE and the C-maMIMO node. In D-maMIMO a number of antenna elements may be blocked but it requires much larger obstacles to block all antenna elements.

High heat concentration: Due to heat concentration it is difficult to make C-maMIMO nodes very small. In D-ma MIMO each antenna element, and its associated processing, generates only a small amount of heat and this simplifies miniaturization.

Large and visible installations: C-maMIMO installations may become large, especially on lower frequency bands. D-maMIMO installations are actually even larger, but the visual impact may be made almost negligible.

Installation requires personnel with "radio skills": Installing a complex piece of hardware in a single location requires planning and most probably also proper installation by certified personnel. In a D-maMIMO installation it is less crucial that each and every one of the very many antenna elements is installed in a very good location. It is sufficient that the majority of the elements are installed in good enough locations. The requirements on installation may be significantly relaxed with a D-maMIMO deployment.

Power limited by regulations, e.g. specific absorption rate SAR: If the antenna elements are located close together there will be an area close to the installation where electromagnetic wave safety rules applies. This is likely to put limits on the total radiated radio frequency power in many installations. In a D-maMIMO installation a user device may come close to a small number of antenna elements, but it is impossible to be physically close to many elements that are distributed over a large area.

There are many significant benefits with D-maMIMO compared to C-maMIMO. But the cabling and internal communication between antenna elements in a D-maMIMO is prohibiting in state-of-the art solutions. It is not economically feasible to connect a separate cable between each antenna element and a central processing unit (e.g. in a star topology) in a D-maMIMO installation.

SUMMARY

It is an object of embodiments herein to provide a MIMO antenna system with improved performance.

Embodiments herein provide an antenna system with distributed power supply. The antenna system comprises a Central Processing Unit (CPU) comprising a central power supply and multiple antenna units connected to the CPU by cables. The antenna system further comprises at least one distributed power supply unit located along a chain of antenna units. At least one antenna unit receives power from the central power supply. At least one antenna unit receives power from another antenna unit or from the at least one distributed power supply unit. In this way at least two power supply domains are set up, where in each power supply domain, a number of antenna units are connected to the same power supply.

According to some embodiments herein, the distributed power supply unit may be any one of an external device connected directly to an antenna unit, an external device inserted in-between antenna units or an internal device installed inside an antenna unit.

According to some embodiments herein, the distributed power supply unit may comprise an AC-to-DC converter and a Power over Ethernet (PoE) switch.

According to some embodiments herein, a maximum power usage may be defined in a power supply domain.

According to some embodiments herein, the distributed power supply unit may comprise a local power storage unit.

According to some embodiments herein, the local power storage unit may be configured to communicate with the CPU and report its power storage status to the CPU.

According to some embodiments herein, the CPU may be configured to dynamically set up the power supply domains based on the power storage status information.

According to some embodiments herein, the CPU may be configured to perform any one of scheduling uplink and downlink traffic, scheduling power charging of the local power storage unit, activating or de-activating of antenna units based on the power storage status information or the maximum power usage in the different power supply domains.

According to some embodiments herein, the CPU may be configured to activate antenna units in a power supply domain based on uplink and downlink traffic.

Embodiments herein also provide an antenna system comprising a Central Processing Unit (CPU) and multiple antenna units connected to the CPU by cables. The CPU comprises a central power supply and a number of antenna units are connected to the central power supply such that a power supply domain is set up. The CPU is configured to activate or de-activate the antenna units in the power supply domain based on uplink and downlink traffic.

Embodiments herein also provide a base station comprising an antenna system as described above.

Embodiments herein also provide a distributed MIMO communication system comprising a plurality of base stations as described above.

Embodiments herein also provide a wireless communication system comprising a plurality of base stations as described above.

According to the embodiments herein, at least two power supply domains are set up in the antenna system, where an antenna stick may receive power-supply from a central processing unit; or another antenna stick; or an external power supply unit. A group of antenna sticks that may be de-activated while still providing pass-through power supply to a neighboring group of antenna sticks. In this way, a semi-distributed massive MIMO system may be implemented where the power supply topology can be different from the fronthaul topology, antenna sticks can perform injection of PoE power and/or store local power, and selective activation of antenna sticks in a power supply domain based on traffic can also be realized.

Therefore embodiments herein provided a MIMO system with improved performance on scalability in terms of power supply, traffic and low path loss and good spatial separation of nearby users.

BRIEF DESCRIPTION OF THE DRAWINGS

Examples of embodiments herein are described in more detail with reference to attached drawings in which.

DETAILED DESCRIPTION

As a part of developing embodiments herein the inventors identified a problem which first will be discussed.

Radio Stripes

Base stations in a radio stripe system may comprise circuit mounted chips inside a protective casing of a cable or a stripe. Receive and transmit processing of each antenna element is performed next to the actual antenna element itself. Since the total number of distributed antenna elements is assumed to be large, e.g. several hundred, the radio frequency transmit power of each antenna element is very low.

Figure 1:
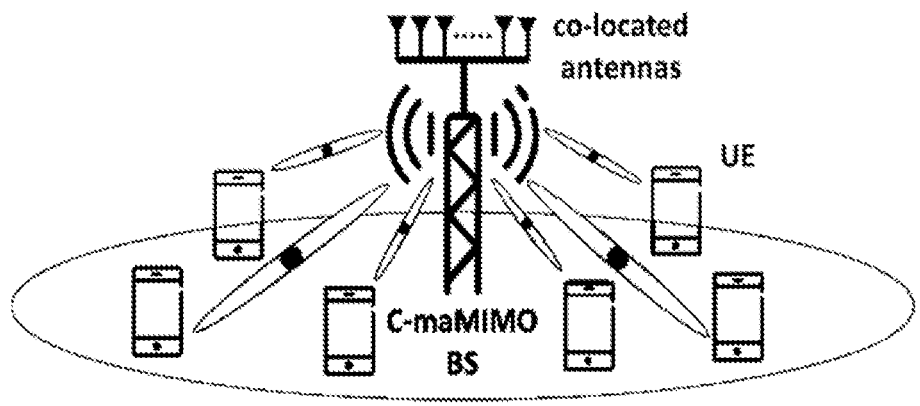
FIG. 1 illustrates a centralized massive MIMO architecture.
Figure 2:
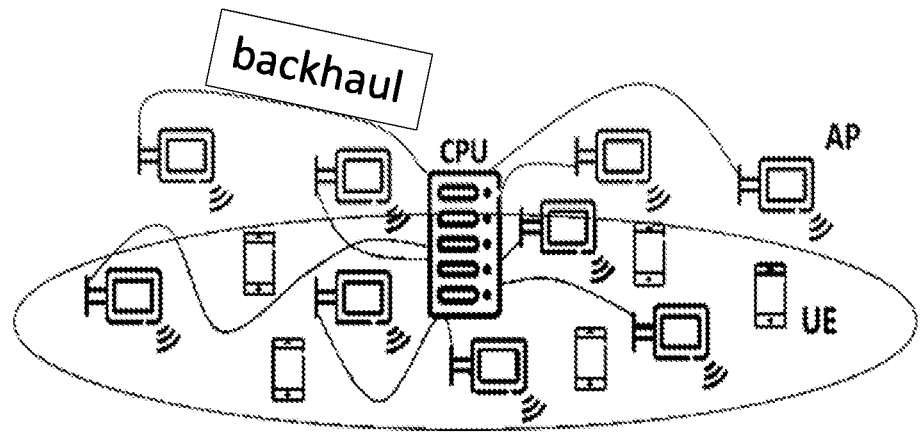
FIG. 2 illustrates a distributed massive MIMO architecture.
Figure 3:
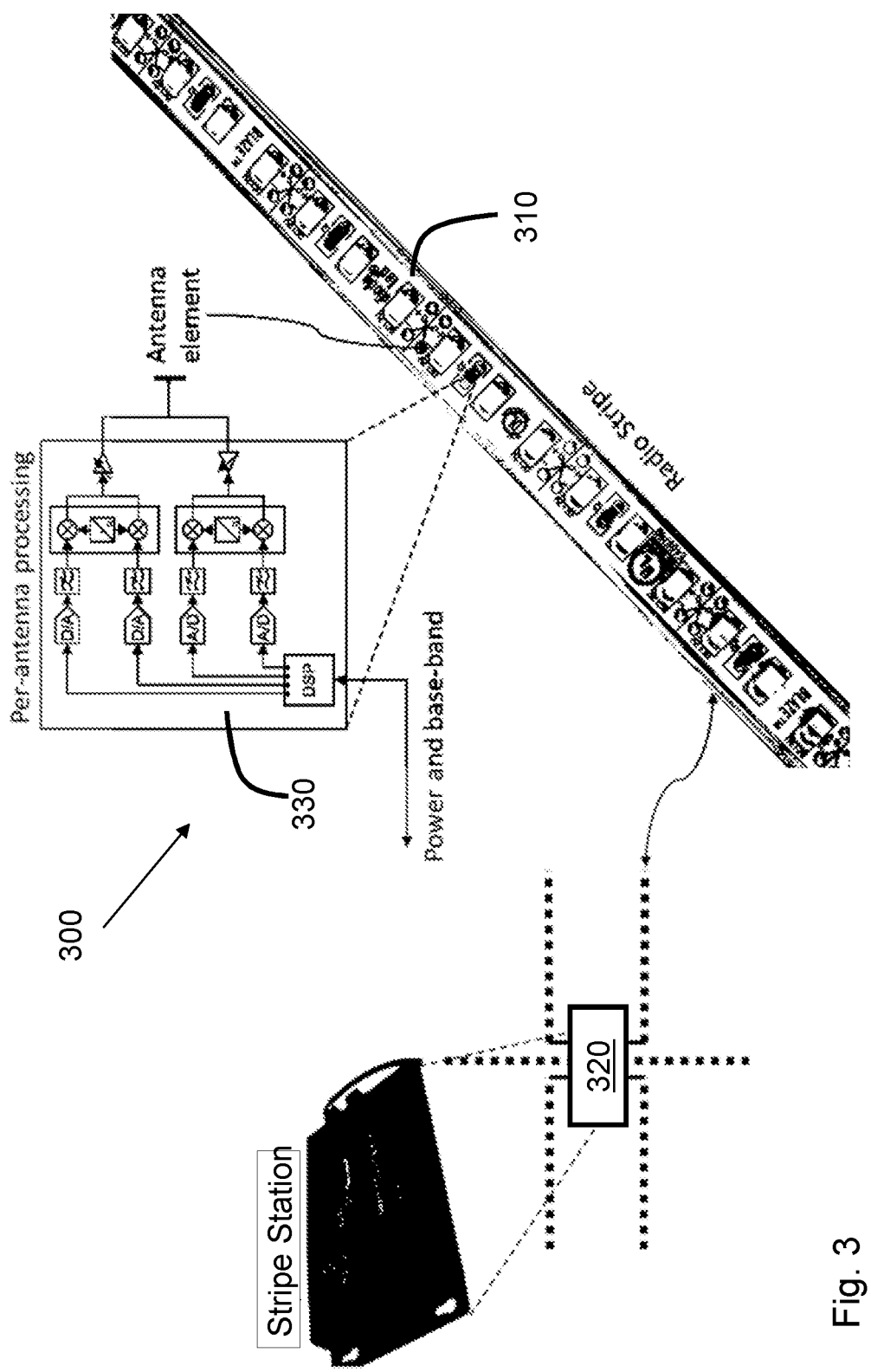
FIG. 3 illustrates an example embodiment of a massive MIMO radio stripe system.

FIG. 3 depicts an example of a massive MIMO radio stripe system 300. The example in FIG. 3 depicts a system mockup and shows a radio stripe 310 connected to a stripe station 320. This figure is only used to exemplify how the actual distributed massive MIMO base station may be envisioned to be built. A central processing unit i.e. the stripe station 320 may connect with more than one radio stripes or distributed MIMO active antenna cables.

The radio stripe 310 may comprise one or more antenna elements, and next to each antenna element, there may be a per-antenna processing unit 330 for processing receive and transmit data for each antenna element.

The actual radio stripes may comprise tape or adhesive glue on the backside, as in the example of Light Emitting Diode (LED) stripes. Or it may simply contain very small per-antenna processing units and antennas protected by the plastics covering the cable.

Figure 4:
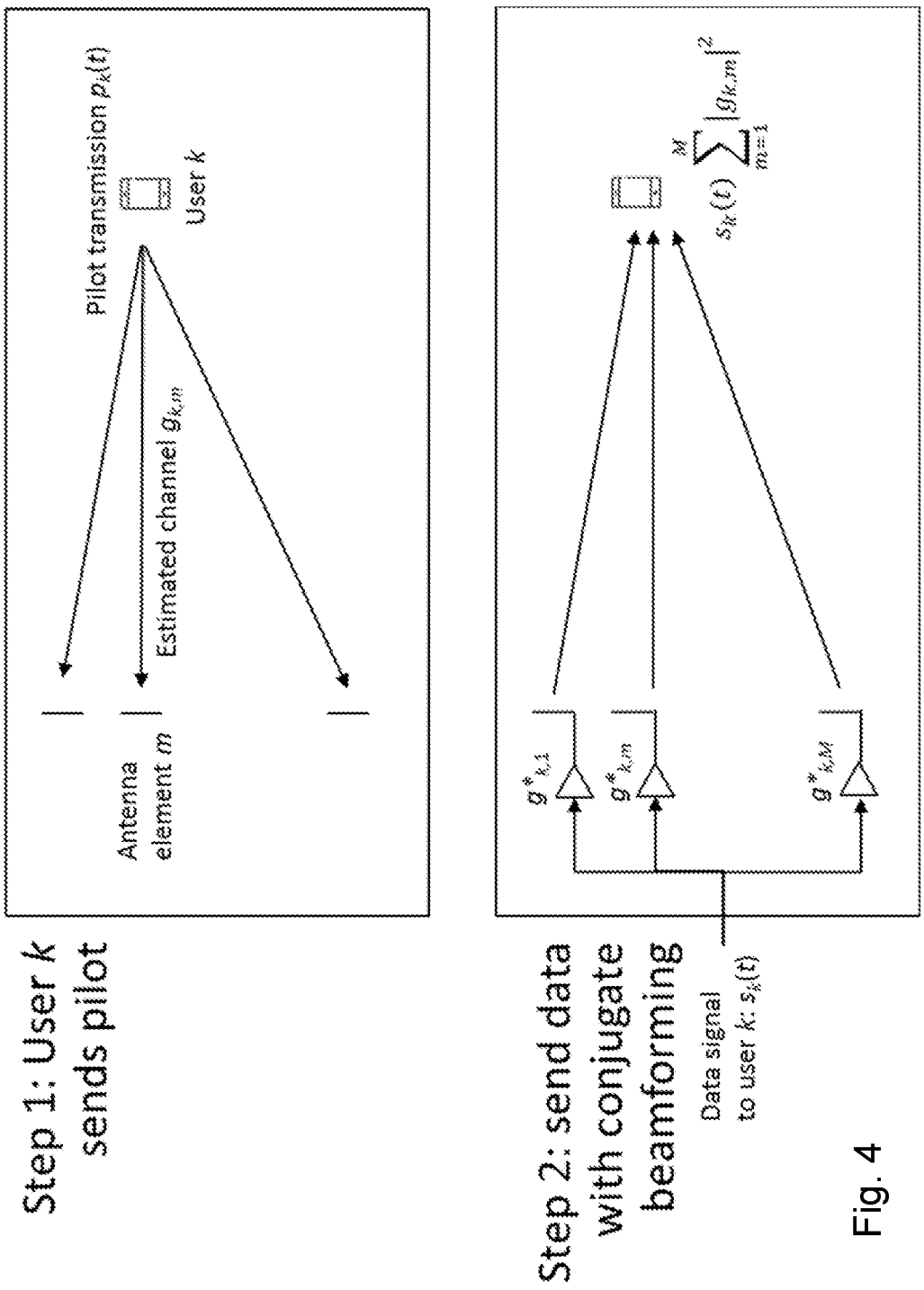
FIG. 4 illustrates an example beamforming processing.

An important observation that has been made is that both the transmitter and receiver processing can be distributed under certain assumption, e.g. see FIG. 4. FIG. 4 illustrates that by using e.g. conjugate beamforming the beamforming processing required may be performed per-antenna element. For example, as shown in FIG. 4, in Step 1, user K may send a pilot $p_k(t)$ to one or more antenna elements m=1, 2 ... M, with estimated channel power $g_{k,m}$. In Step 2, each antenna element processes data $s_k(t)$ to be send to the user K with conjugate beamforming, i.e. by calculating $s_k(t) \cdot g_{k,m}^*$, where m=1, 2 ... M. Then the received signal by the user K is calculated by $s_k(t) \cdot \Sigma |g_{k,m}|^2$.

Figure 5:
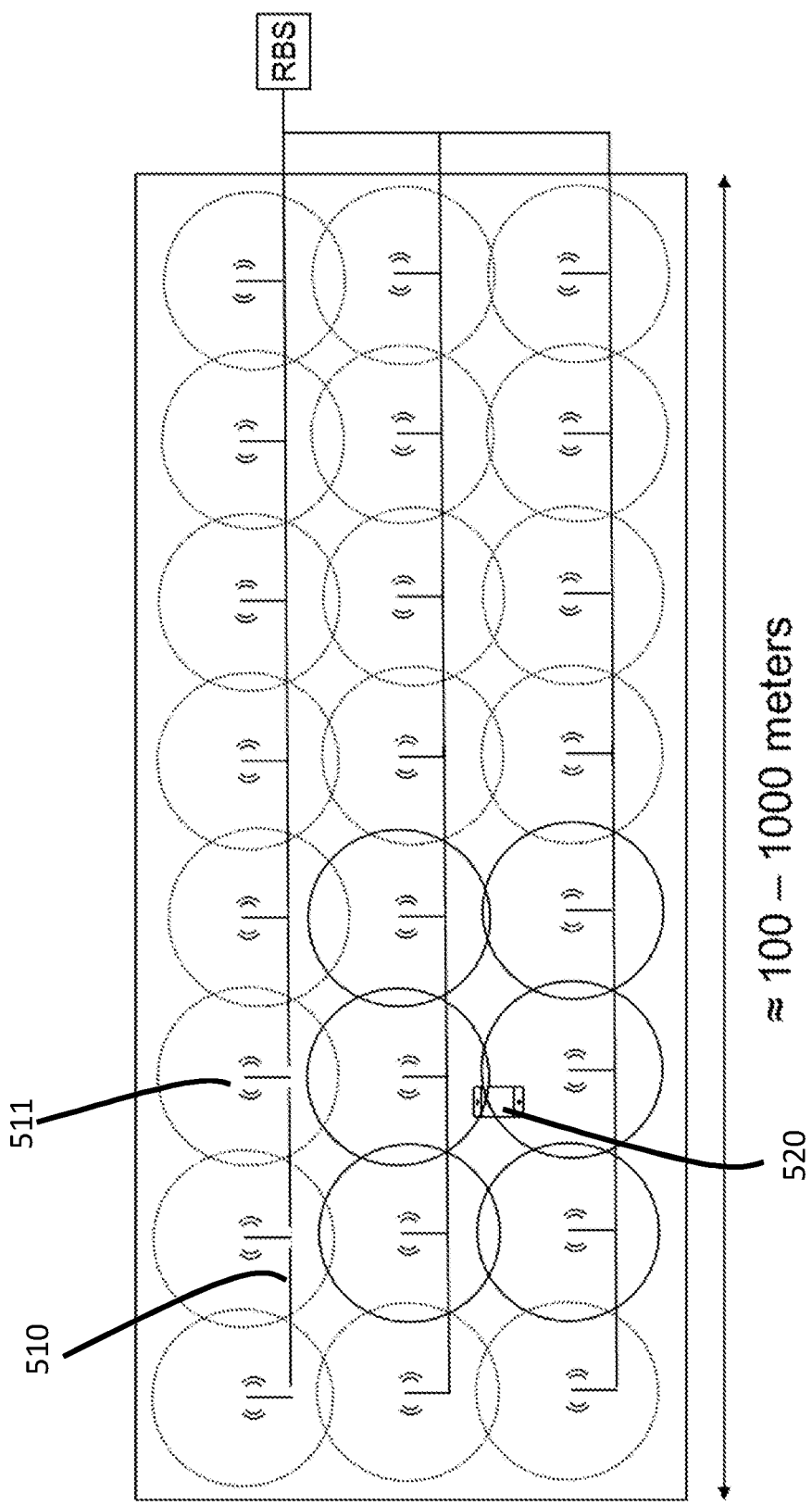
FIG. 5 illustrates a deployment example depicting how a distributed massive MIMO system may be used indoor in a building.

Radio stripe system deployments may e.g. be used to provide good coverage in factory buildings as schematically depicted in FIG. 5. FIG. 5 depicts an deployment example of how a distributed massive MIMO system may be used indoor in a building e.g. factory. As shown in FIG. 5, a base station RBS comprises one or more radio stripes 510. Each radio stripe 510 comprises one or more antenna elements 511, shown as an antenna symbol with a circle. Antennas used to serve the user device 520 in this example are marked with solid lines.

A prior art solution that utilizes small distributed remote radio heads provides a small and low power remote radio head solution which only comprises analog-to-digital (ND), digital-to-analog (D/A), and RF up/down converters, power amplifier and antenna.

If it is tried to implement a distributed (massive) MIMO system using this prior art solution, a separate power-over-Ethernet cable to each radio head would be needed. The radio head is then fed with a Common Public Radio Interface (CPRI) signal and all beamforming logic is performed in a centralized node. This is not a scalable solution since it results in a "spaghetti-monster" of cables if to scale this solution up to a massive MIMO scale.

Figure 6:
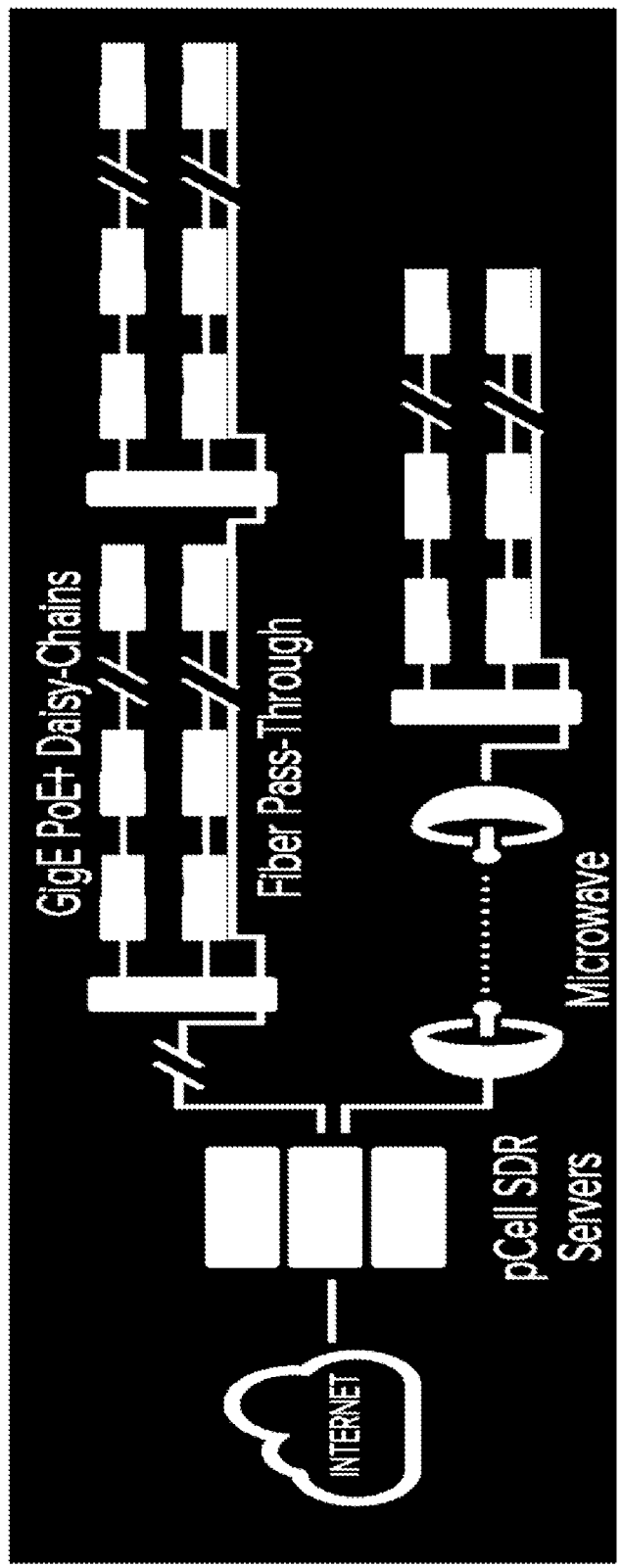
FIG. 6 illustrates a prior art solution utilizing daisy-chain.

Recently a "daisy-chain" based extension to the above solution that partly address this problem, see FIG. 6. This solution enables one antenna port to be duplicated and distributed over a larger area. But each daisy-chain still only provides one antenna port and it is fed with one CPRI signal that is forwarded to every element in the daisy-chain. The RF-signals transmitted over the air by different nodes are therefore identical in this solution.

To support multiple independent antenna ports that can be used e.g. for pre-coder-based beamforming they still need parallel daisy chains. This unfortunately results in a spread of interference over an unnecessarily large area. The antenna ports they can use for pre-coder-based beamforming are distributed in space and not point-shaped.

Figure 7:
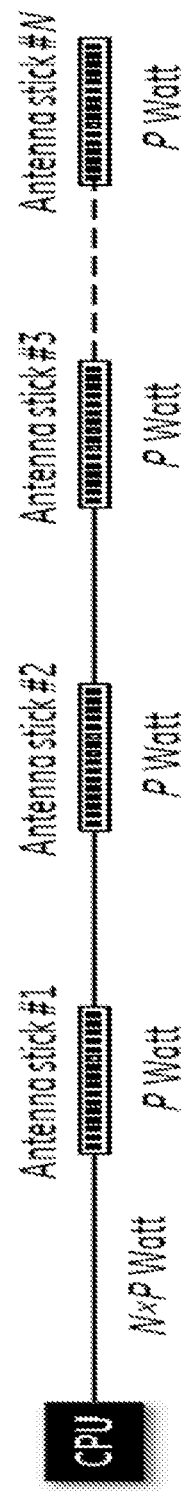
FIG. 7 illustrates a (semi-) distributed massive MIMO system.

Power-supply i.e. the electrical current in the cables, will limit the number of antenna units or sticks that can be serially connected and form a (semi-) distributed massive MIMO system, see FIG. 7. FIG. 7 depicts a power-supply, i.e. cable current, which will limit the number of antenna sticks that can be serially connected. The serially connected antenna sticks are connected to a CPU.

Fronthaul, also known as antenna fronthaul, is a term that refers to the connection of the Centralized Radio Access Network (C-RAN), a new type of cellular network architecture of centralized baseband units (BBU), at the access layer of the network to remote standalone radio heads at cell sites. With fronthaul remote radio heads separate the radio elements of a base station from the baseband controller resulting in easier radio deployment e.g. at the top of a cell tower and increased signal coverage range. Disparate radio elements are connected to the centralized controllers through the Common Public Radio Interface (CPRI). The latest CPRI specification adds capacity to remote radio heads, achieves higher-order MIMO and allows multi-carrier configuration. This type of interface supports shared infrastructure and dynamic capacity allocation, which enables the reality of a completely open RAN that can be used for future 5G applications and deployment scenarios. Limitations related to fronthaul are very different from limitation related to power supply. While fronthaul may be limited by number of bits/s or latency in the interface, the power supply is limited by peak and average power, peak and average current, and heat generation. It is very unlikely that a solution optimized for UL or DL fronthaul will be well dimensioned for supplying power to the units in a (semi-) distributed massive MIMO system.

Solutions for power supply and fronthaul scale differently when adding additional nodes in an existing semi-distributed massive MIMO system.

A solution that is suitable for one hardware generation may turn out to be less suitable for a newer hardware generation. If, for example, a new antenna processing unit (APU) chip is designed that reduce the power consumption with 50% then that would have a significant impact on the design of the power supply, but it may not have any impact on the design and dimensioning of the fronthaul. Therefore, it is important that solutions for fronthaul and power supply can be separately scaled when needed.

Combining fronthaul and power, as on e.g. Power Over Ethernet (PoE), in the same interface ensures the most scares resource, i.e. power capacity and fronthaul capacity, becomes the resource that limits scalability.

Example embodiments herein relate to scalable power-supply for a distributed MIMO communication system comprising multiple antenna sticks or units to provide an improved MIMO communication system.

Some example embodiments herein provide a semi-distributed massive MIMO system characterized in that the power-supply topology is different from fronthaul topology.

Some further example embodiments herein provide antenna sticks that may perform injection of PoE power and/or store local power.

Some further example embodiments herein provide selective activation of antenna sticks in a power supply domain based on traffic.

Embodiments herein provide at least the advantage of scalability in terms of power-supply in a distributed massive MIMO system.

Figure 8:
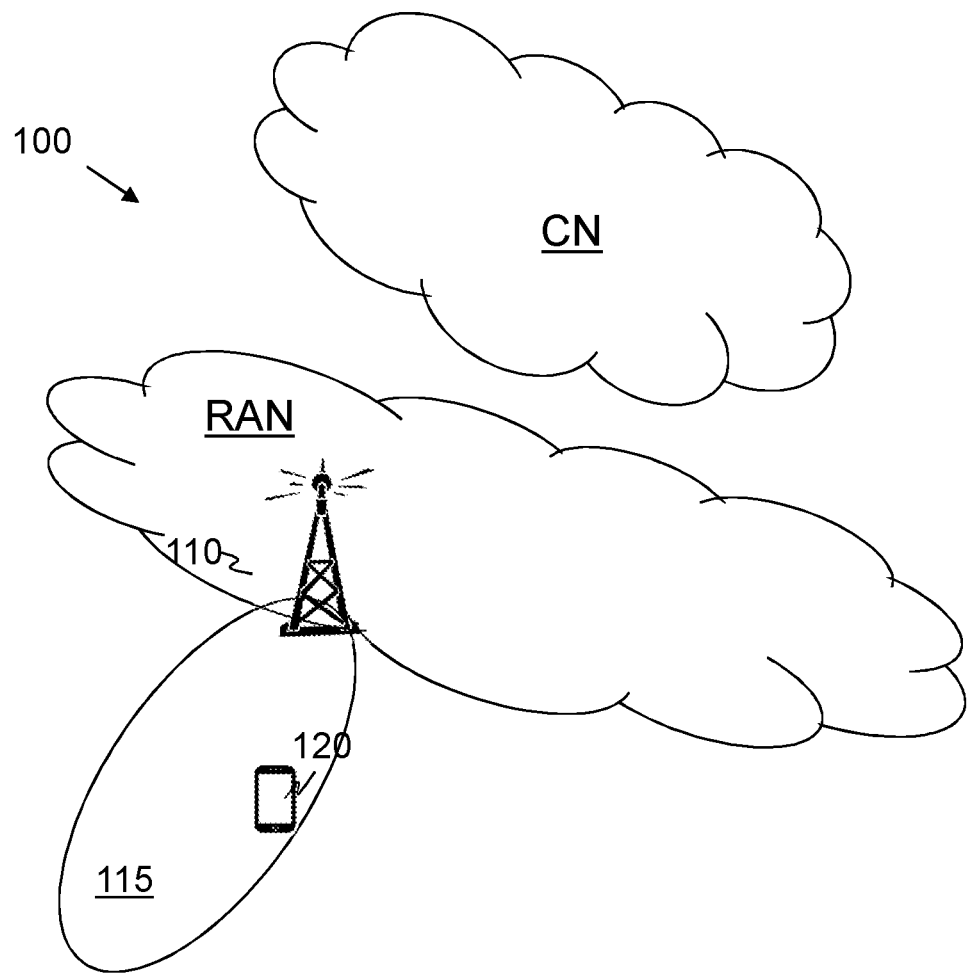
FIG. 8 illustrates a wireless communications network in which embodiments herein may be implemented.

Embodiments herein relate to wireless communication networks in general. FIG. 8 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Base stations operate in the wireless communications network 100 such as a base station 110. The base station 110 provides radio coverage over a geographical area, a service area referred to as a cell 115, which may also be referred to as a beam or a beam group of a first radio access technology (RAT), such as 5G, LTE, Wi-Fi or similar. The base station 110 may each be a NR-RAN node, transmission and reception point e.g. a radio base station (RBS), a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the base station 110 depending e.g. on the first radio access technology and terminology used. The base station 110 may be referred to as serving radio access nodes and communicates with a UE with Downlink (DL) transmissions to the UE and Uplink (UL) transmissions from the UE.

A semi-distributed massive Multiple-Input Multiple-Output (MIMO) communication system within the wireless communications system 100, comprises a plurality of base stations such as the base station 110.

A number of UEs operate in the wireless communication network 100, such as the UE 120. The UE 120 may be a mobile station, a non-access point (non-AP) STA, a STA, a user equipment and/or a wireless terminals, that communicate via one or more network nodes such as the base station 110, in a RAN to one or more core networks (CN), e.g. comprising CN node. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Embodiments herein may be implemented in network nodes such as the base station 110.

Figure 9:
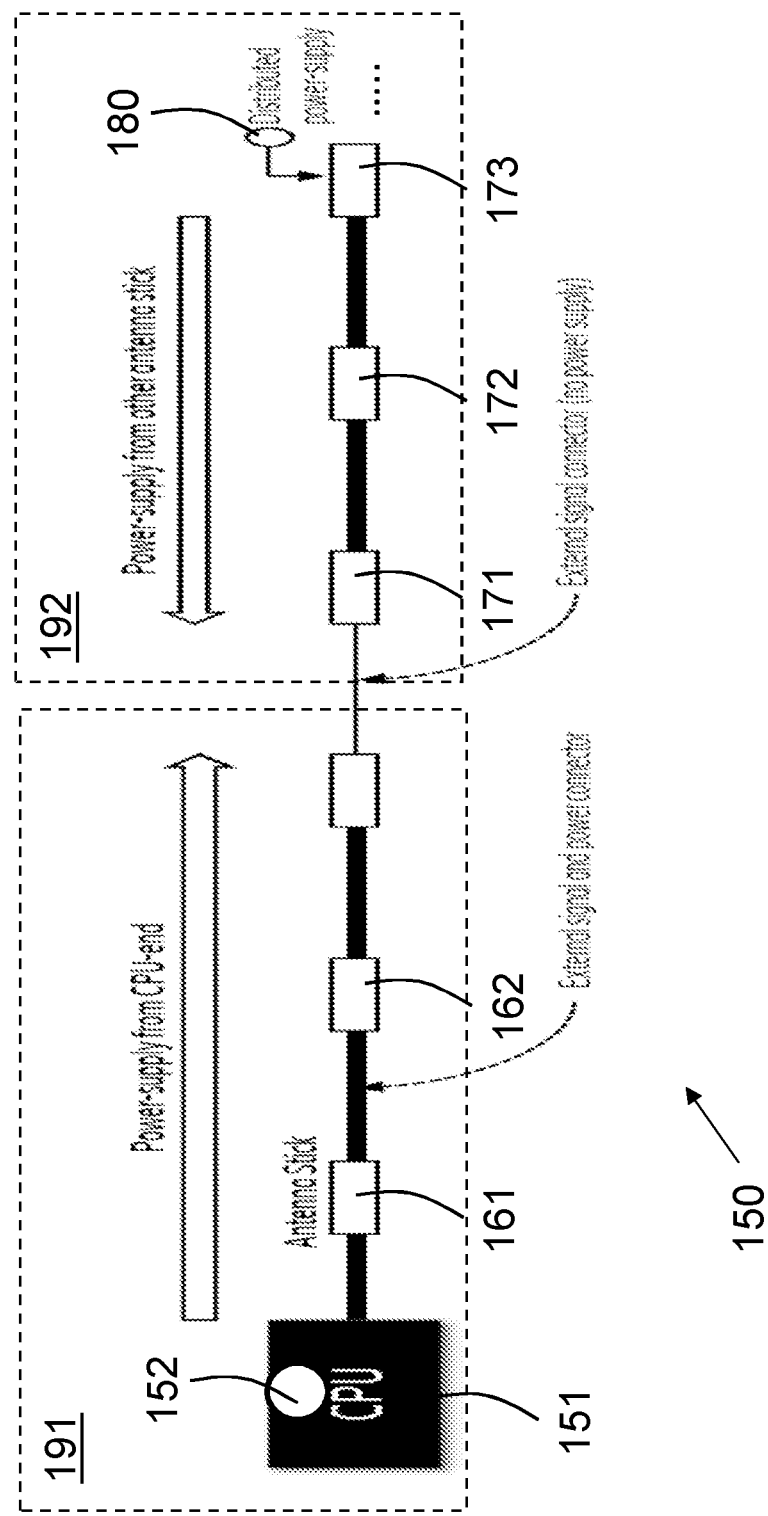
FIG. 9 illustrates an example of an antenna system according to embodiments herein.

FIG. 9 shows an example of an antenna system 150 with distributed power supply according to the embodiments herein.

The antenna system 150 comprises a CPU 151 comprising a central power supply 152.

The antenna system 150 further comprises multiple antenna units or sticks 161, 162 . . . 171, 172, 173 . . . connected to the CPU by cables.

The antenna system 150 further comprises at least one external or distributed power supply unit 180 located at some place along a chain of antenna units.

As shown in FIG. 9, there are at least two power supply domains 191, 192. In each power supply domain, a number of antenna units are connected to the same power supply. An antenna stick may receive power-supply from a central processing unit, or another antenna stick, or an external power supply unit, where the said "another antenna stick" may either be located further away, or closer to, the CPU. As shown in FIG. 9, at least one antenna unit 161 receives power from the central power supply 152, at least one antenna unit 171 receives power from another antenna unit 172, at least one antenna unit 173 receives power from the at least one distributed power supply unit 180.

A group of antenna units may be de-activated while still providing pass-through power supply to a neighboring group of antenna units.

Embodiments herein will now be further explained and exemplified and may be combined with embodiments as described above in any suitable way.

The wording distributed MIMO communication system and semi-distributed massive MIMO system may be used interchangeably herein.

Example Embodiment: Alternating Power and Fronthaul Directivity

Figure 10:
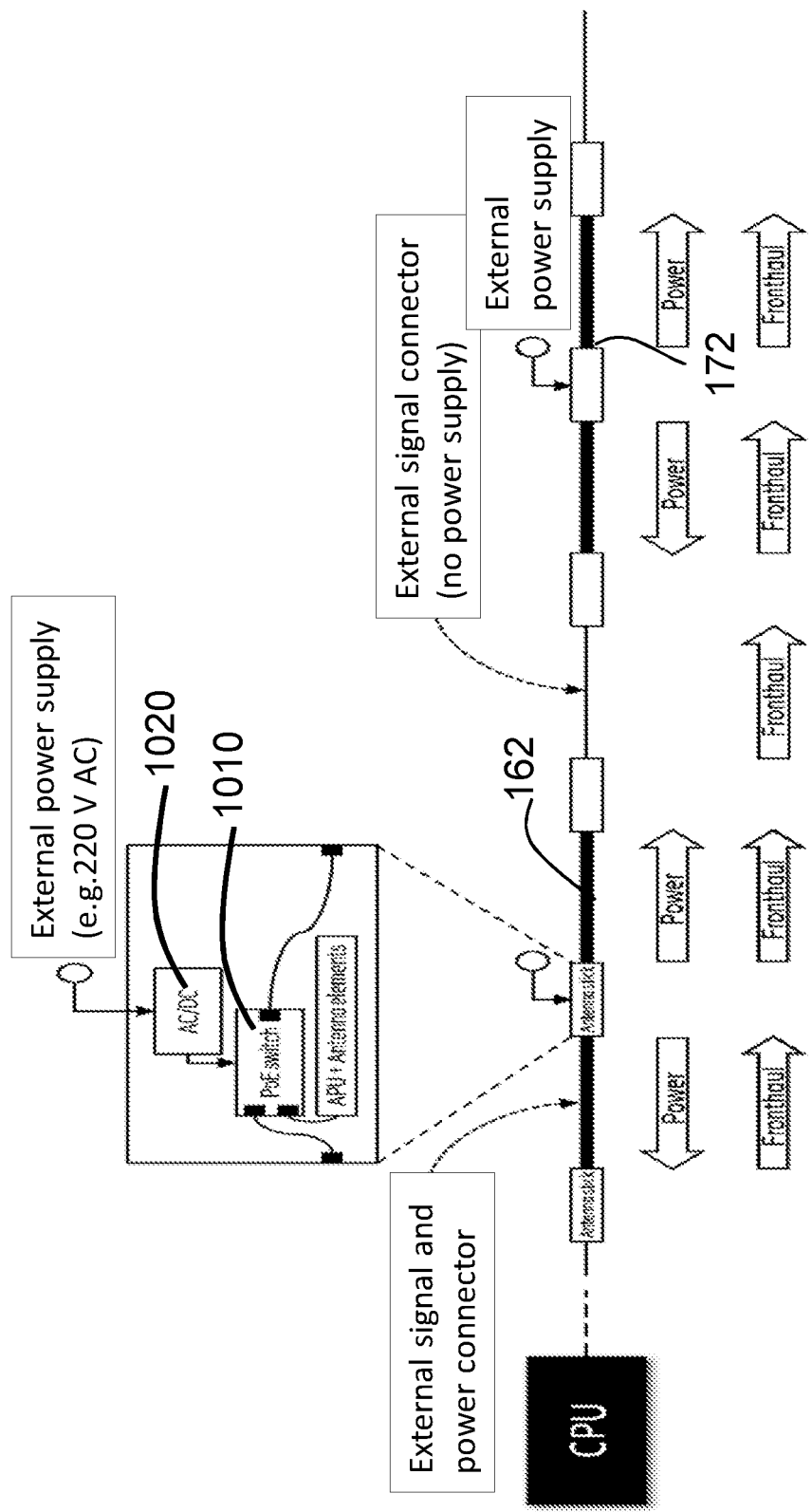
FIG. 10 illustrates an antenna system with distributed power supply according to the embodiments herein.

In some example embodiments, the antenna system 150 comprising multiple antenna sticks is provided. The antenna sticks in the antenna system 150 are powered differently. By distributing PoE power in both directions, both in the same direction as the fronthaul and in the reverse direction, see FIG. 10, from an antenna stick that has external power supply, it will effectively double the number of antenna sticks that can be powered via PoE. Assuming that it is possible to power N adjacent antenna stick with PoE, this configuration only requires an external power supply for every 2N+1 antenna stick. FIG. 10 depicts an example embodiment of a case with N=1 and hence every third antenna stick needs an external power supply also referred to as integrated PoE injection inside the distributed MIMO communications system 150, e.g. the semi-distributed massive MIMO system.

This may be achieved by integrating a PoE switch 1010, capable of injecting power in the Ethernet interface cables, in all or some of the antenna sticks, e.g. antenna sticks 162, 172, see FIG. 10. As shown in FIG. 10, an AC-to-DC converter 1020 may be integrated in all or some of the antenna sticks, e.g. antenna sticks 162, 172.

In some embodiments the cables that carry both power and fronthaul are different, e.g. thicker, from cables that only carry fronthaul, e.g. thinner. This is schematically depicted with thick and thin connecting lines between antenna sticks in FIG. 10.

Example Embodiment: Additional "Power Sticks" that Inject Power Along the Way

The PoE injectors may alternatively be separate devices, here denoted "power sticks" or "distributed power supply unit". Terms "power sticks" and "distributed power supply unit" may be used interchangeably hereafter. A power stick may be inserted in-between antenna sticks in a modular manner. A power stick may e.g. be
    an external device that connects directly to an antenna stick, or
    an external device that can be inserted in-between antenna sticks, or internal hardware in (at least one) antenna stick that allows for flexible installation of distributed power.

In some embodiments inserting additional power sticks in the antenna system 150 allows for a "capacity upgrade". If the power supply is limiting performance and not fronthaul or deployment, then inserting new power supply unit along a chain of antenna sticks will increase the overall system performance.

Figure 11:
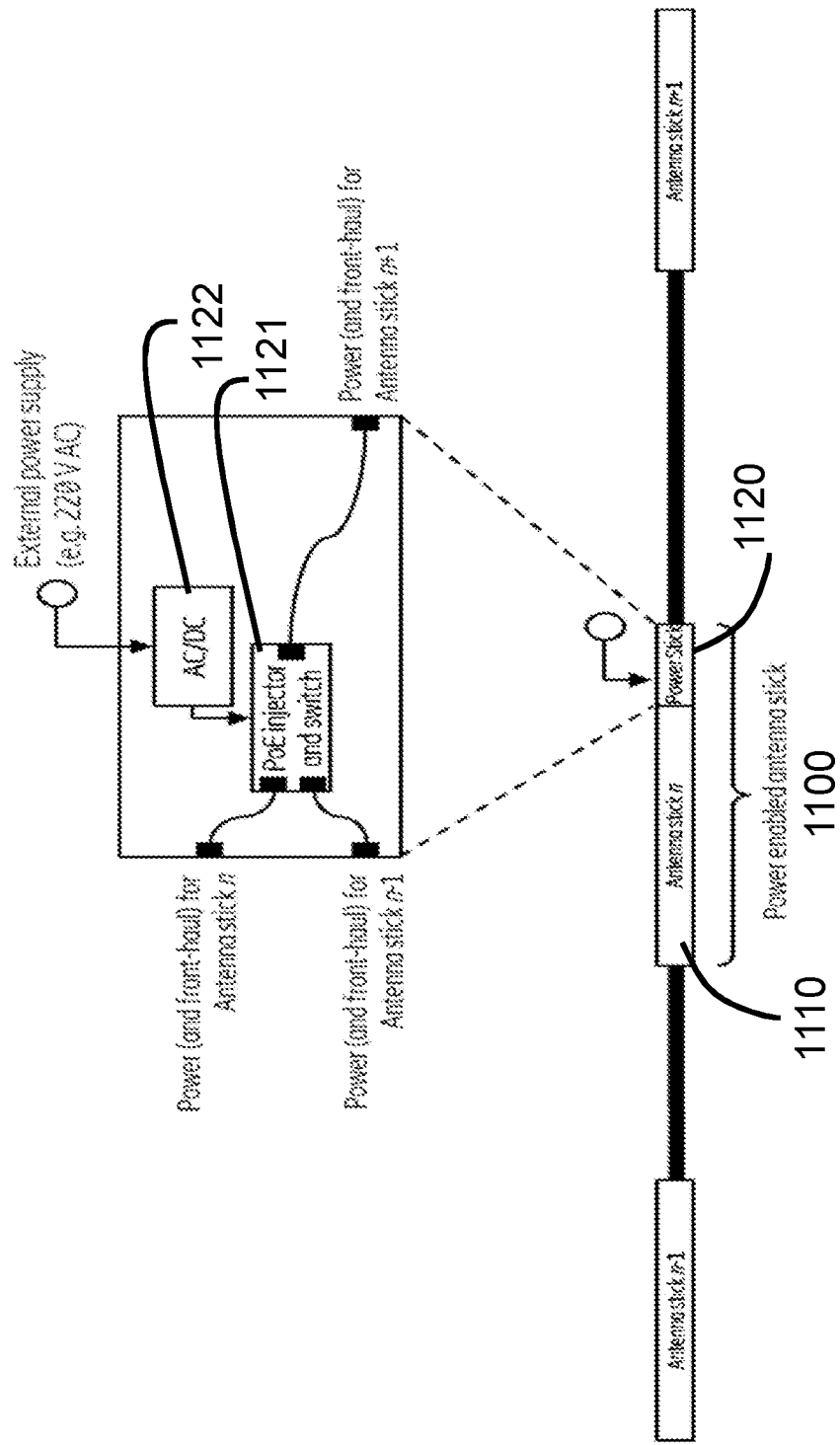
FIG. 11 illustrate an example of a power enabled antenna stick according to embodiments herein.

The power stick may or may not be integrated in the same casing as the antenna stick, see FIG. 11. FIG. 11 depicts a power enabled antenna stick 1100 may consist of an antenna stick 1110 and an additional "power stick" 1120. The power stick 1120 may comprise a PoE switch 1121 and an AC-to-DC converter 1122.

Example Embodiment: Local Distributed Power Storage in Power Sticks

Figure 12:
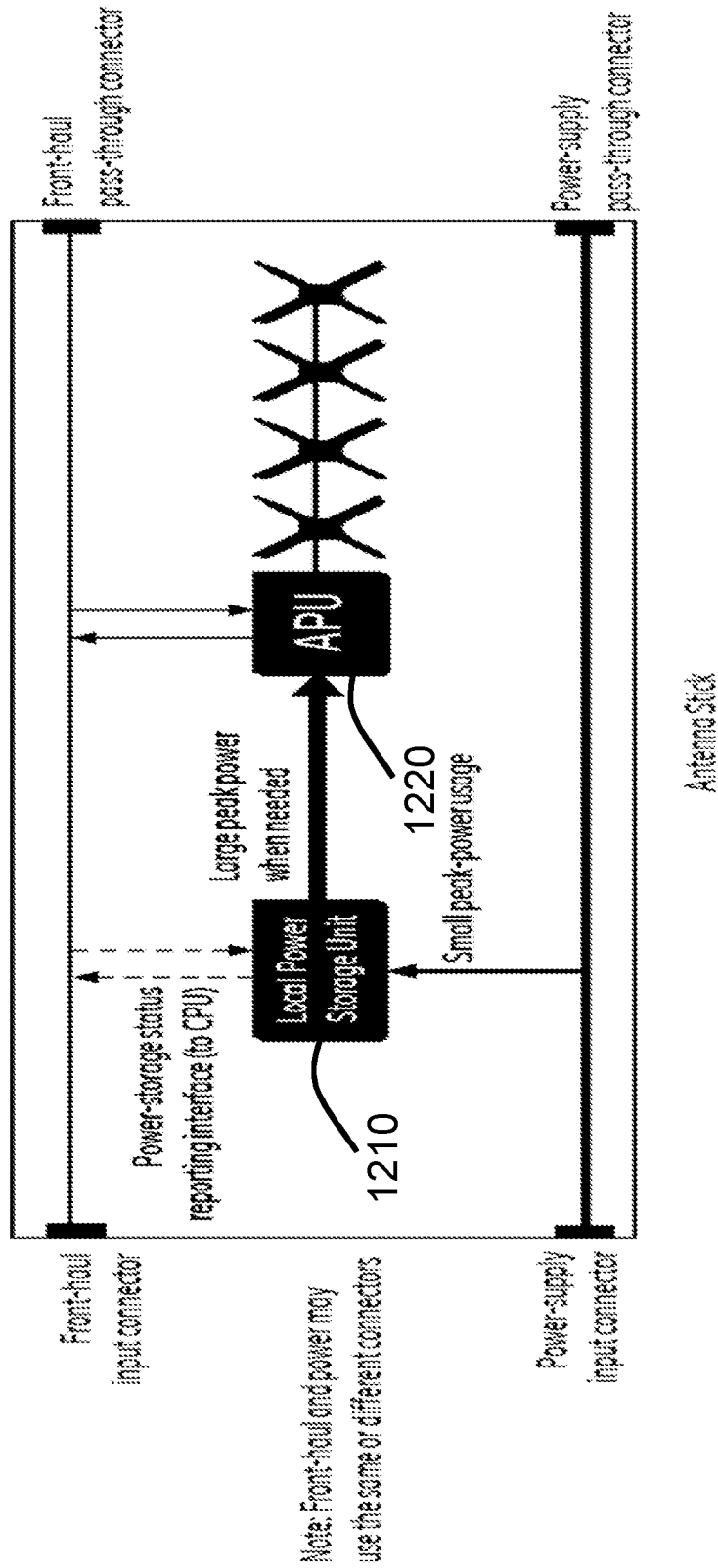
FIG. 12 illustrates an example of distribution of local power storage units according to embodiments herein.

A power stick, e.g. the distributed power supply unit 180 may comprise a Local Power Storage Unit (LPSU) such as a battery or a large capacitor. A power stick may also provide local distribution of "grid-power" to adjacent antenna sticks, see FIG. 12. FIG. 12 depicts distribution of local power storage units 1210 close to antenna processing units (APU) 1220 to reduce the requirements on the power supply in the antenna system 150.

Integration of local power storage units may be very beneficial in the antenna system 150 for multiple reasons. For example, the peak current in power-supply cables may become very large. This requires thick expensive cables, or high voltage, or it may limit the number of antenna sticks that can be serially connected. By introducing internal local power-storage units, e.g. high capacity capacitor, to the antenna sticks the peaks in the power supply may be reduced. Instead of supporting "peak power" it is only needed to dimension power supply for the average power.

Note that the local power storage unit depicted in FIG. 12 may also be located outside an antenna stick, e.g. in-between antenna sticks.

The power-storage unit may communicate with the CPU and report the power-storage status back to the CPU. This information may then be used to schedule UL/DL traffic or to allow power charging of the local power storage units when possible, or for activation/de-activation of antenna sticks.

Example Embodiment: Distributed and Opportunistic Power-supply

Figure 13:
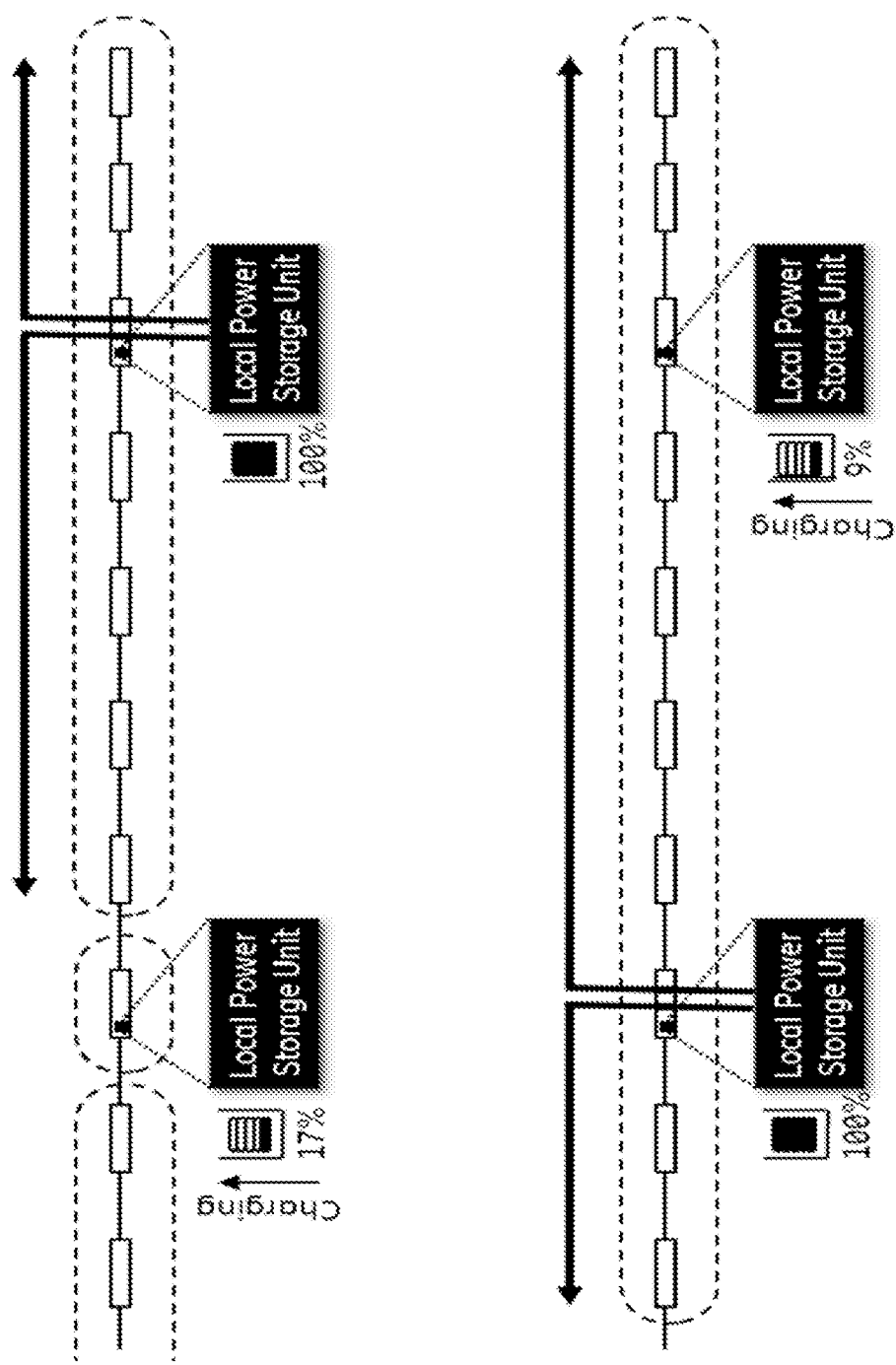
FIG. 13 illustrates an example of distributed power supply in a distributed massive MIMO system enables opportunistic definition of power supply domains according to embodiments herein.

When distributed power storage units are used in the antenna system 150 it may be taken advantage of the fact that the power consumption in different parts, e.g. different antenna sticks, will vary with the user activity and location. This is schematically depicted in FIG. 13. FIG. 13 illustrates distributed power supply in the antenna system 150 which enables opportunistic definition of power supply domains. At one time instant, shown in the top part of FIG. 13, there is only 17% capacity in one local power storage unit while another one is at 100%. To best utilize the stored power and to allow charging of local power storage units that are close to depletion, the power supply domains may be dynamically re-defined or set up, e.g. shown in dashed lines in FIG. 13, along the antenna system 150. At a later time, shown in the lower part of FIG. 13, the available distributed power is different results in a different set up of power supply domains in the antenna system 150.

Example Embodiment: Powering Multiple Radio Stripes

Figure 14:
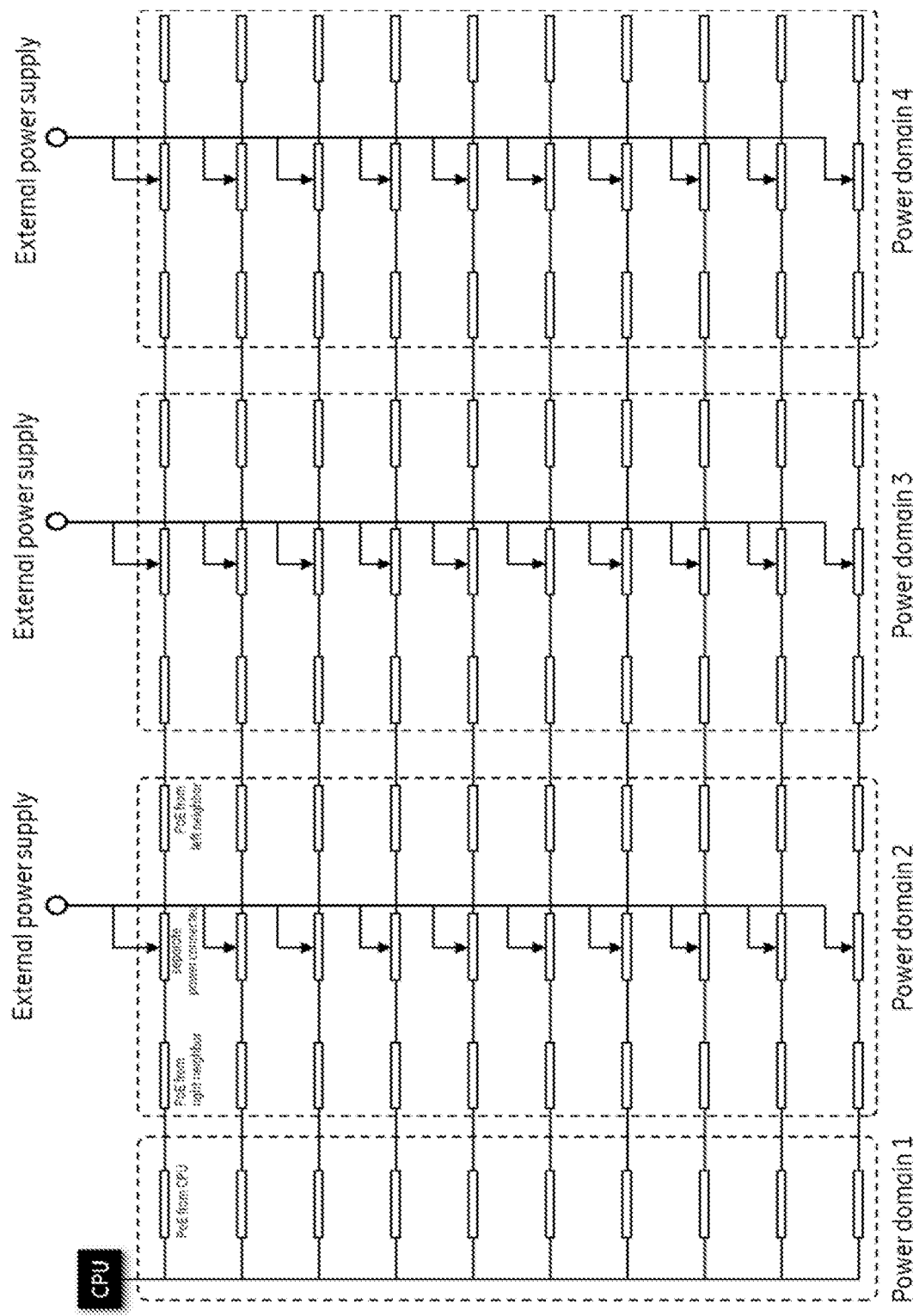
FIG. 14 illustrates an example of power supply domains in a distributed massive MIMO system according to embodiments herein.

When covering a large building such as a factory hall, it may be needed to deploy the antenna system 150 comprising several sets of serially connected antenna sticks, see FIG. 14. FIG. 14 depicts an embodiment of large installations of (semi-) distributed massive MIMO, where power-supply domains may be defined independently over multiple fronthaul connections. By defining power-domains comprising of antenna sticks connected to the same external power supply, it is seen that that the power supply capacity is limited in a different dimension than the fronthaul capacity.

Within a power-domain, a maximum power usage may be defined and it is up to the CPU to ensure that the capacity of the power supply in each power-domain is never exceeded. This may be ensured e.g. by de-activating some of the antenna sticks in power-domains that are using too much power. Alternatively, the CPU may consider the power usage limitations in the different power supply domains when it schedules the user plane traffic of the UEs.

Example Embodiment: Traffic and Power Adaptive Stick Activation

As discussed above, one important observation when deploying a large scale distributed MIMO communications system is that all UEs do not benefit from being served by all antenna sticks. For each UE it will be the most nearby antenna sticks that contribute the most to the user experience.

Figure 15:
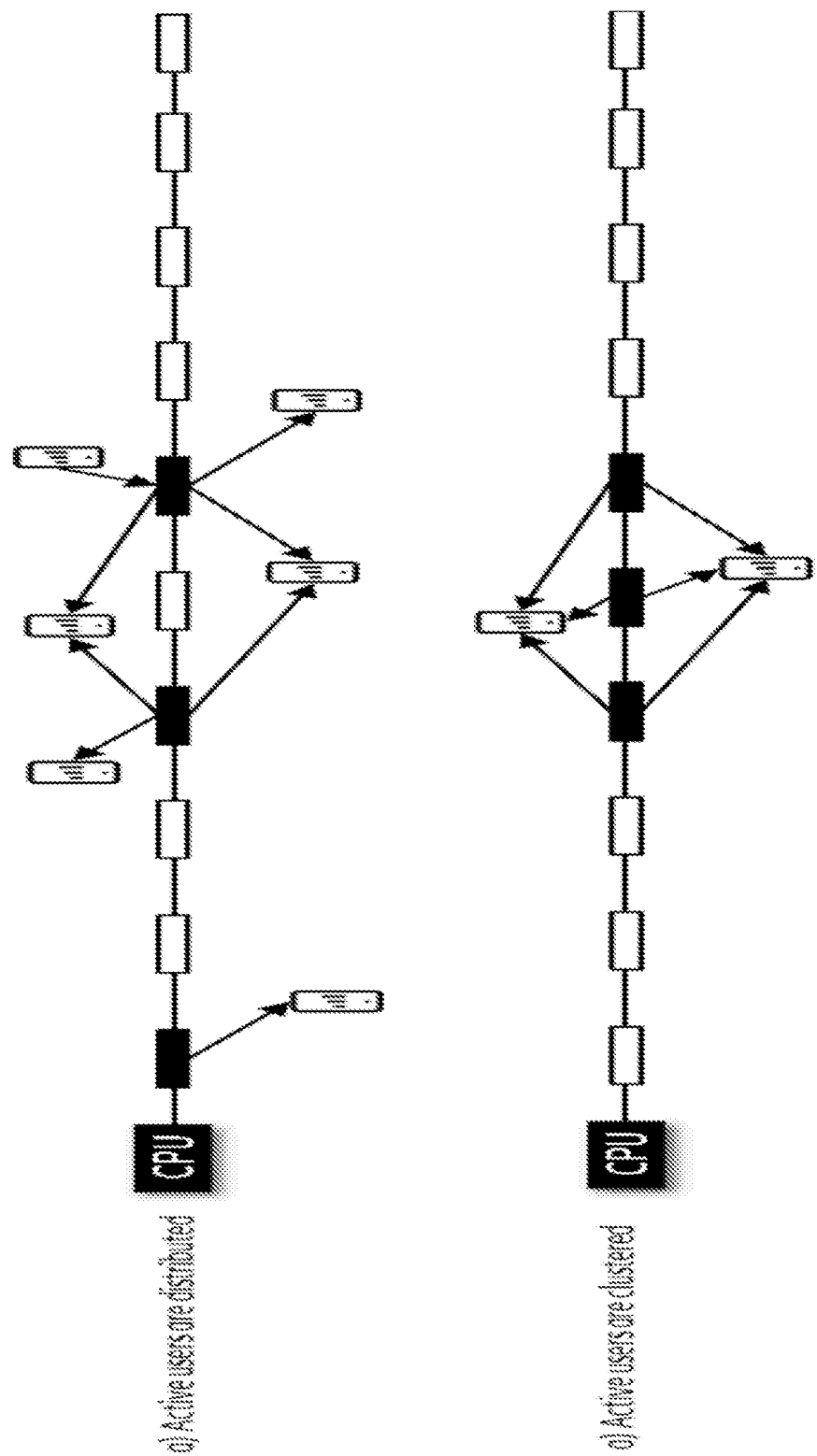
FIG. 15 illustrates an example of selective activation of antennas within a power supply domain according to embodiments herein.

FIG. 15 depicts an embodiment of the antenna system 150 comprising multiple antenna sticks, with selective activation of antenna sticks within a power supply domain enabling both low path loss and good spatial separation of nearby UEs, although not necessarily at the same time. If it is assumed that the PoE capacity only allows for three of the antenna sticks to be active simultaneously, it is still possible to deploy more than three antenna sticks in serial. In case the active UEs are distributed over the coverage area of the antenna system 150, good performance still can be achieved by selectively activating only antenna sticks close to scheduled and active UEs, as shown in the top part of FIG. 15. When UEs are clustered, more antennas close to the active UEs may be activated to support Multi-user spatial separation (MU-MIMO).

When UEs are distributed by space multi-user spatial separation is not needed (and cannot be support it either) but it is an advantage to have antenna sticks close to the UEs. When UEs are clustered, there is a need for spatial multi-user separation which may be supported in any location, as shown in the lower part of FIG. 15.

Note that power-supply domains, adaptive activation antenna sticks may also be "two dimensional", as shown in FIG. 14, where multiple fronthaul connectors goes in one direction and the power-domains are defined across these fronthaul connectors rather than along the fronthaul connectors.

Figure 16:
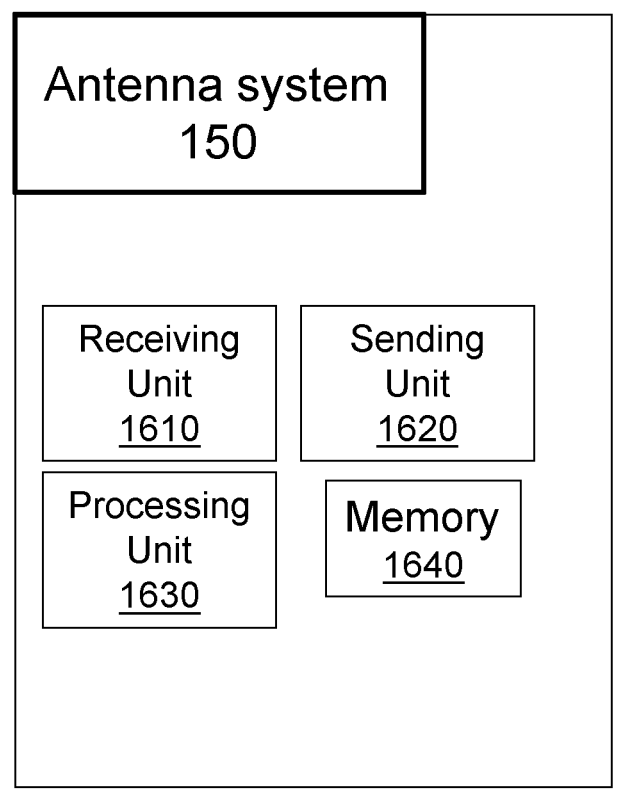
FIG. 16 illustrates an example of a base station comprising an antenna system according to embodiments herein.

FIG. 16 shows an example of the base station 110 comprising the antenna system 150 according to embodiments herein. The base station may further comprise a receiving unit 1610, a sending unit 1620, a processing unit 1630.

The base station 110 may further comprise memory 1640 comprising one or more memory units. The memory comprises instructions executable by the processing unit 1630 in the base station 110.

Some example Embodiments numbered 1-12 are described below. The following embodiments refer to FIGS. 8-16.

Embodiment 1: An antenna system 150 with distributed power supply comprising:
- a Central Processing Unit, CPU, comprising a central power supply;
- multiple antenna units connected to the CPU by cables; and
- at least one distributed power supply unit located at someplace along a chain of antenna units; wherein
- at least one antenna unit receives power from the central power supply;
- at least one antenna unit receives power from another antenna unit;
- at least one antenna unit receives power from the at least one distributed power supply unit such that at least two power supply domains are set up, wherein in each power supply domain, a number of antenna units are connected to the same power supply.

Embodiment 2: The antenna system according to Embodiment 1, wherein the distributed power supply unit is any one of an external device connected directly to an antenna unit, an external device inserted in-between antenna units or an internal device installed inside an antenna unit.

Embodiment 3: The antenna system according to any Embodiments 1-2, wherein the distributed power supply unit comprises an Alternating Current (AC) to Direct Current (DC) converter and a PoE switch.

Embodiment 4: The antenna system according to any Embodiments 1-3, wherein a maximum power usage is defined in a power supply domain.

Embodiment 5: The antenna system according to any Embodiments 1-4, wherein the distributed power supply unit comprises a local power storage unit.

Embodiment 6: The antenna system according to Embodiment 5, wherein the local power storage unit is configured to communicate with the CPU and report its power storage status to the CPU.

Embodiment 7: The antenna system according to Embodiment 6, wherein the CPU is configured to dynamically set up the power supply domains based on the power storage status information.

Embodiment 8: The antenna system according to any Embodiments 4-7, wherein the CPU is configured to perform any one of scheduling uplink and downlink traffic, scheduling power charging of the local power storage unit, activating or de-activating of antenna units based on the power storage status information or the maximum power usage in the different power supply domains.

Embodiment 9: The antenna system according to any Embodiments 1-8, wherein the CPU is configured to activate antenna units in a power supply domain based on uplink and downlink traffic.

Embodiment 10: An antenna system comprising a Central Processing Unit, CPU, and multiple antenna units connected to the CPU by cables, wherein the CPU comprises a central power supply and a number of antenna units are connected to the central power supply such that a power supply domain is set up, wherein the CPU is configured to activate or de-activate the antenna units in the power supply domain based on uplink and downlink traffic.

Embodiment 11: A base station 110 comprising an antenna system 150 according to any Embodiments 1-10.

Embodiment 12: A distributed MIMO communication system comprising a plurality of base stations 110 according to Embodiment 11.

Embodiment 13: A wireless communication network 100 may comprise a plurality of base stations 110 according to Embodiment 11.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. An antenna system with distributed power supply comprising:
- a Central Processing Unit, (CPU), comprising a central power supply;
- multiple antenna units connected to the CPU by cables; and
- at least one distributed power supply unit located along a chain of antenna units;
  - at least one antenna unit receiving from the central power supply; and
  - at least one antenna unit receives power from another antenna unit or from the at least one distributed power supply unit such that at least two power supply domains are set up, and in each power supply domain, a number of antenna units are connected to the same power supply, the distributed power supply unit comprising a local power storage unit, the local power storage unit being configured to:
    - communicate with the CPU; and
    - report its power storage status to the CPU, and the CPU being configured to schedule power charging of the local power storage unit.

2. The antenna system according to claim 1, wherein the distributed power supply unit is any one of an external device connected directly to an antenna unit, an external device inserted in-between antenna units or an internal device installed inside an antenna unit.

3. The antenna system according to claim 1, wherein the distributed power supply unit comprises an AC-to-DC converter and a Power over Ethernet, PoE, switch.

4. The antenna system according to claim 1, wherein a maximum power usage is defined in a power supply domain.

5. The antenna system according to claim 4, wherein the CPU is configured to perform any one of scheduling uplink and downlink traffic, and activating or de-activating of antenna units based on the power storage status or the maximum power usage in the different power supply domains.

6. The antenna system according to claim 1, wherein the CPU is configured to dynamically set up the power supply domains based on the reported power storage status information.

7. The antenna system according to claim 1, wherein the CPU is configured to activate antenna units in a power supply domain based on uplink and downlink traffic.

8. A base station comprising an antenna system with a distributed power supply, the antenna system having:
- a Central Processing Unit, (CPU), comprising a central power supply;
- multiple antenna units connected to the CPU by cables; and
- at least one distributed power supply unit located along a chain of antenna units;
  - at least one antenna unit receiving power from the central power supply; and at least one antenna unit receiving power from another antenna unit or from the at least one distributed power supply unit such that at least two power supply domains are set up, and in each power supply domain, a number of antenna units are connected to the same power supply, the distributed power supply unit comprising a local power storage unit, the local power storage unit being configured to:

communicate with the CPU; and report its power storage status to the CPU, and the CPU being configured to schedule power charging of the local power storage unit.

9. A wireless communications network comprising a plurality of base stations, each base station of the plurality of base stations comprising an antenna system with a distributed power supply, the antenna system having:

a Central Processing Unit, (CPU), comprising a central power supply;

multiple antenna units connected to the CPU by cables; and at least one distributed power supply unit located along a chain of antenna units;

at least one antenna unit receiving power from the central power supply; and at least one antenna unit receiving power from another antenna unit or from the at least one distributed power supply unit such that at least two power supply domains are set up, and in each power supply domain, a number of antenna units are connected to the same power supply, the distributed power supply unit comprising a local power storage unit, the local power storage unit being configured to:

communicate with the CPU; and report its power storage status to the CPU, and the CPU being configured to schedule power charging of the local power storage unit.

\* \* \* \* \*